United States Patent
Sato et al.

(10) Patent No.: US 10,826,097 B2
(45) Date of Patent: Nov. 3, 2020

(54) FUEL CELL

(71) Applicant: TOYOTA JIDOSHA KABUSHIKI KAISHA, Aichi-ken (JP)

(72) Inventors: Kenji Sato, Kasugai (JP); Sachio Okada, Sunto-gun (JP); Hideya Kadono, Toyota (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 169 days.

(21) Appl. No.: 15/950,406

(22) Filed: Apr. 11, 2018

(65) Prior Publication Data

US 2018/0301727 A1    Oct. 18, 2018

(30) Foreign Application Priority Data

Apr. 17, 2017   (JP) ................ 2017-081042

(51) Int. Cl.
| | |
|---|---|
| *H01M 8/1004* | (2016.01) |
| *H01M 8/0258* | (2016.01) |
| *H01M 8/0273* | (2016.01) |
| *H01M 8/1007* | (2016.01) |
| *H01M 8/2483* | (2016.01) |
| *H01M 8/242* | (2016.01) |
| *H01M 8/0247* | (2016.01) |
| *H01M 8/0267* | (2016.01) |

(52) U.S. Cl.
CPC ....... *H01M 8/1004* (2013.01); *H01M 8/0247* (2013.01); *H01M 8/0258* (2013.01); *H01M 8/0273* (2013.01); *H01M 8/1007* (2016.02); *H01M 8/242* (2013.01); *H01M 8/2483* (2016.02); *H01M 8/0267* (2013.01)

(58) Field of Classification Search
CPC .. H01M 8/242; H01M 8/0247; H01M 8/0258; H01M 8/0273
See application file for complete search history.

(56) References Cited

U.S. PATENT DOCUMENTS

2016/0099475 A1\*   4/2016   Ishida ................ H01M 8/0258
                                                                     429/482

FOREIGN PATENT DOCUMENTS

| JP | 2014-063727 | | 4/2014 |
|---|---|---|---|
| JP | 2015-195153 | A | 11/2015 |
| JP | 2016-076380 | A | 5/2016 |
| JP | 2017-117780 | | 6/2017 |

\* cited by examiner

*Primary Examiner* — Ladan Mohaddes
(74) *Attorney, Agent, or Firm* — Finnegan, Henderson, Farabow, Garrett & Dunner, LLP

(57) ABSTRACT

A fuel cell includes a power generating body including a membrane electrode assembly, a resin frame placed around the power generating body, and a pair of separators laminated on the resin frame so as to sandwich the power generating body and the resin frame. The resin frame has a resin-frame-side manifold in which reaction gas flows in a direction passing through the resin frame, an opening that holds the power generating body, and a gas introduction channel formed through the resin frame between the resin-frame-side manifold and the opening. Each separator has a separator-side manifold through which the reaction gas flows, and which is provided at a position corresponding to the resin-frame-side manifold in a lamination direction, and the gas introduction channel has a gas introduction part that extends into the separator-side manifold, when viewed in the lamination direction.

4 Claims, 9 Drawing Sheets

FUEL CELL

INCORPORATION BY REFERENCE

The disclosure of Japanese Patent Application No. 2017-081042 filed on Apr. 17, 2017 including the specification, drawings and abstract is incorporated herein by reference in its entirety.

BACKGROUND

1. Technical Field

The disclosure relates to a fuel cell.

2. Description of Related Art

A fuel cell having a resin frame that is placed at the outer periphery of a membrane electrode assembly, and is sandwiched between a pair of separators, is known (see Japanese Patent Application Publication No. 2014-063727 (JP 2014-063727 A)).

SUMMARY

For example, in JP 2014-063727 A, when a through-hole is formed in a resin frame within a range in which the frame is sandwiched between separators, to form a gas introduction channel, as shown in FIG. 6, an inlet through which reaction gas is introduced may be closed or blocked, as shown in the lower section of FIG. 6, if the position of the resin frame relative to the separators is shifted due to a manufacturing error, for example. Therefore, variations may arise in a pressure loss that appears when reaction gas is led to the membrane electrode assembly, and the voltage of the fuel cell may become unstable. Thus, a technology that can reduce or eliminate the variation in the pressure loss at the time of introduction of reaction gas into the fuel cell has been desired.

One aspect of the disclosure is concerned with a fuel cell having a power generating body including a membrane electrode assembly, a resin frame placed around the power generating body, and a pair of separators laminated on the resin frame so as to sandwich the power generating body and the resin frame. The resin frame has a resin-frame-side manifold in which reaction gas flows in a direction passing through the resin frame, an opening that holds the power generating body, and a gas introduction channel formed through the resin frame between the resin-frame-side manifold and the opening. The pair of separators has a separator-side manifold through which the reaction gas flows, and the separator-side manifold is provided at a position corresponding to the resin-frame-side manifold as viewed in a lamination direction. The gas introduction channel has a gas introduction part that extends into the separator-side manifold, when viewed in the lamination direction. In the fuel cell thus constructed, the gas introduction channel formed in the resin frame extends into the separator-side manifold. Therefore, even when the position of the resin frame relative to the separators is shifted due to a manufacturing error, for example, an inlet through which reaction gas is introduced can be prevented from being closed or blocked. Accordingly, variation in a pressure loss at the time of introduction of reaction gas into the fuel cell can be reduced or eliminated.

At least one of the pair of separators may have a recessed portion at a position facing the gas introduction channel, and the length of the recessed portion along a direction of gas flow in the gas introduction channel may be shorter than the length of the gas introduction channel. In the fuel cell thus constructed, the total thickness of a plurality of fuel cells stacked together can be reduced by an amount corresponding to the thickness of the recessed portions; therefore, the thickness can be prevented from being excessively increased.

The resin frame may have a plurality of gas introduction channels between the resin-frame-side manifold and the opening, and each of the plurality of gas introduction channels may be the above-indicated gas introduction channel of the resin frame. The gas introduction parts of at least a part of the plurality of gas introduction channels may have substantially the same length. With the fuel cell thus constructed, variation in the pressure loss among the gas introduction channels can be reduced or eliminated.

In the fuel cell as described above, a plurality of flow channels that permit the reaction gas to flow into the power generating body may be connected with the gas introduction channel, between the pair of separators and the resin frame, and the pair of separators may have a distribution flow channel that distributes the reaction gas supplied from the gas introduction channel to the flow channels. With the fuel cell thus constructed, the reaction gas introduced from the gas introduction channel can be distributed to a larger number of flow channels; therefore, the power generation efficiency can be improved.

The present disclosure may be implemented in various forms. For example, the disclosure may be implemented in the form of a fuel cell stack that consists of a plurality of fuel cells stacked together, or a fuel cell, or in the form of a method of producing the fuel cell.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

A. Embodiment

Figure 1:
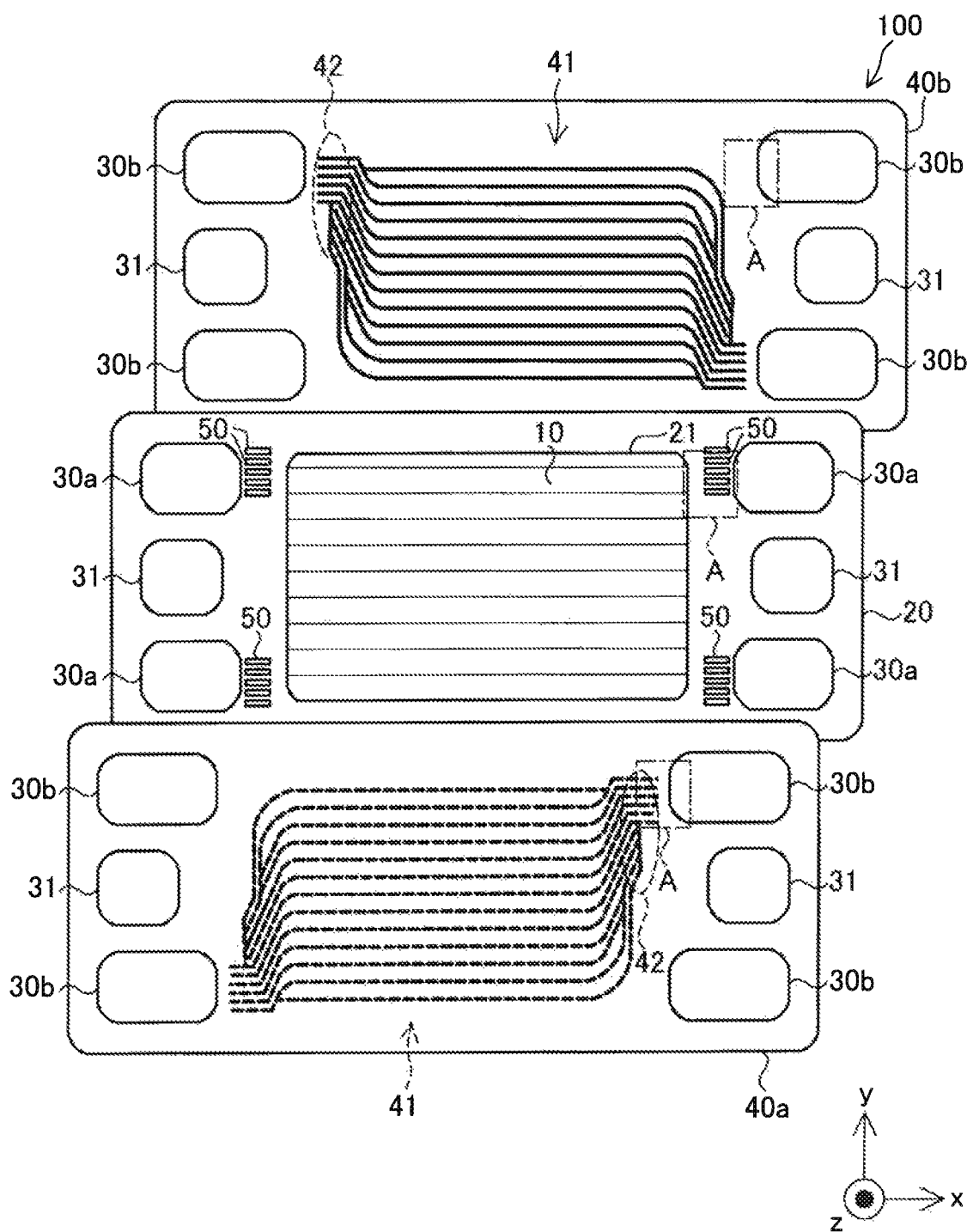
FIG. 1 is an explanatory exploded view showing a fuel cell according to one embodiment of the disclosure.

FIG. 1 is an explanatory exploded view of a fuel cell 100 according to one embodiment of the disclosure. The fuel cell 100 is a polymer electrolyte fuel cell that is supplied with hydrogen and oxygen as reaction gases, and generates electric power. The fuel cell 100 includes a power generating body 10, a resin frame 20, a pair of separators 40a, 40b, coolant manifolds 31, flow channels 41, and distribution flow channels 42.

The power generating body 10 includes an electrolyte membrane (not shown), catalyst layers (not shown) formed adjacent to the opposite surfaces of the electrolyte membrane, and gas diffusion layers (not shown). The electrolyte membrane is a solid polymer thin film that shows good protonic conductivity when it is in a wet state. The electrolyte membrane is provided by an ion-exchange membrane of fluorine-based resin, for example. The catalyst layer includes a catalyst that promotes chemical reaction between hydrogen and oxygen, and carbon particles that carry the catalyst. The electrolyte membrane and the catalyst layers are assembled together to form a membrane electrode assembly (MEA).

The gas diffusion layers are provided adjacent to corresponding surfaces of the catalyst layers. The gas diffusion layers serve to diffuse reaction gas used for electrode reaction, along a planar direction of the electrolyte membrane, and are formed of a porous base material for diffusion layers. As the diffusion-layer base material, porous base materials having electrical conductivity and gas diffusibility, including carbon fiber base materials, graphitic fiber base materials, and foam metals, may be used. The electrolyte membrane, catalyst layers, and the gas diffusion layers are assembled together to form a membrane electrode gas-diffusion-layer assembly (MEGA).

The resin frame 20 is a frame-like resin member placed around the power generating body 10. In this embodiment, polyethylene terephthalate (PET) is used for the resin member. However, as the resin member, various thermoplastic resin members, such as polypropylene and polyethylene, may also be used. The resin frame 20 has an opening 21, and resin-frame-side manifolds 30a. The resin frame 20 holds the power generating body 10 in the opening 21. The reaction gas flows through the resin-frame-side manifolds 30a, in a direction (z-axis direction) that extends through the resin frame 20.

The resin frame 20 includes a plurality of gas introduction channels 50 between each of the resin-frame-side manifolds 30a and the opening 21. The gas introduction channels 50 are formed through the resin frame 20. With the gas introduction channels 50 thus formed through the resin frame 20, the thickness of the resin frame 20, and consequently, the thickness of the fuel cell 100, can be reduced, as compared with the case where grooves are formed in a surface of the resin frame 20 to form gas introduction channels. In another embodiment, the resin frame 20 may have only one gas introduction channel 50 between each resin-frame-side manifold 30a and the opening 21.

The above-mentioned pair of separators 40a, 40b are laminated on the resin frame 20 so as to sandwich the power generating body 10 including the membrane electrode assembly, and the resin frame 20. Each of the separators 40a, 40b is formed by pressing and shaping a metal plate made of stainless steel, titanium, or an alloy thereof, for example. In this embodiment, the separator 40a is a cathode-side separator, and the separator 40b is an anode-side separator. In this embodiment, the separator 40a and the separator 40b will be collectively called "separators 40". The separators 40 have separator-side manifolds 30b through which reaction gas flows.

The separator-side manifolds 30b are provided at positions corresponding to the resin-frame-side manifolds 30a as viewed in the lamination direction (z-axis direction). The corresponding positions as viewed in the lamination direction mean substantially the same positions in the planar direction (x-axis direction and y-axis direction). In this embodiment, the opening area of the resin-frame-side manifold 30a is smaller than the opening area of the separator-side manifold 30b. In this embodiment, the resin-frame-side manifolds 30a and the separator-side manifolds 30b will be collectively called "manifolds 30". The manifolds 30 communicate the resin frame 20 with the separators 40, and the reaction gas flows through the manifolds 30. The coolant manifolds 31 communicate the resin frame 20 with the separators 40, and coolant flows through the coolant manifolds 31.

The flow channels 41 are formed between the separators 40 and the resin frame 20. The flow channels 41 permit the reaction gas to flow into the power generating body 10. The distribution flow channels 42 distribute the reaction gas supplied from the gas introduction channels 50, to the flow channels 41.

Figure 2:
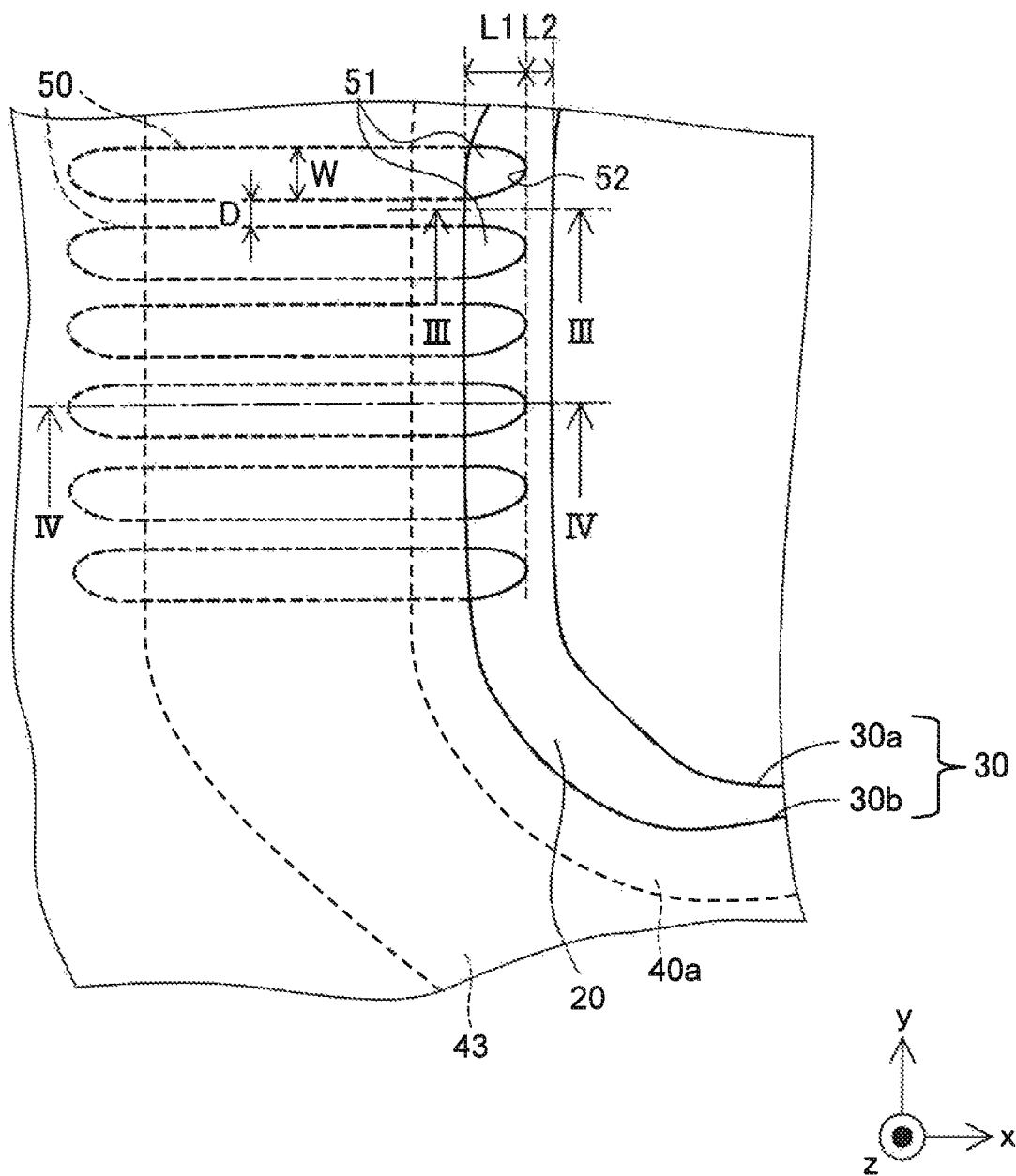
FIG. 2 is an enlarged view of "A" portion of FIG. 1.

FIG. 2 is an enlarged view of an "A" portion in the case where the resin frame 20 and the pair of separators 40 of FIG. 1 are joined together. In the enlarged view of FIG. 2, the vicinity of the manifolds 30 through which hydrogen gas flows is illustrated. As shown in FIG. 2, the resin frame 20 includes gas introduction parts 51 in the vicinity of the resin-frame-side manifold 30a. The gas introduction parts 51 serve to introduce hydrogen gas from the manifolds 30 into the gas introduction channels 50. The gas introduction part 51 is an end portion of each gas introduction channel 50 which is closer to the manifolds 30. More specifically, the gas introduction part 51 is an end portion of the gas introduction channel 50 which extends into the separator-side manifolds 30b, as viewed in the lamination direction (z-axis direction) of the separators 40 on the resin frame 20.

The length L1 of each of the gas introduction parts 51, more specifically, a distance from an edge of the separator-side manifold 30b to an end portion 52 of the gas introduction part 51, is the same length. The length L1 may be determined as desired provided that it is larger than zero. For example, the length L1 is preferably determined such that the opening area of the gas introduction part 51 when it is viewed in the lamination direction (z-axis direction) is equal to or smaller than the channel cross-sectional area of the gas introduction channel 50. The length L2 from the end portion 52 of the gas introduction part 51 to an edge of the resin-frame-side manifold 30a may also be determined as desired provided that it is larger than zero, and it does not excessively impede flow of reaction gas in the manifolds 30. The ratio of the width W of the gas introduction channel 50 to the distance D between adjacent ones of the gas introduction channels 50 is preferably in the range of 0.5 to 3.0

Figure 3:
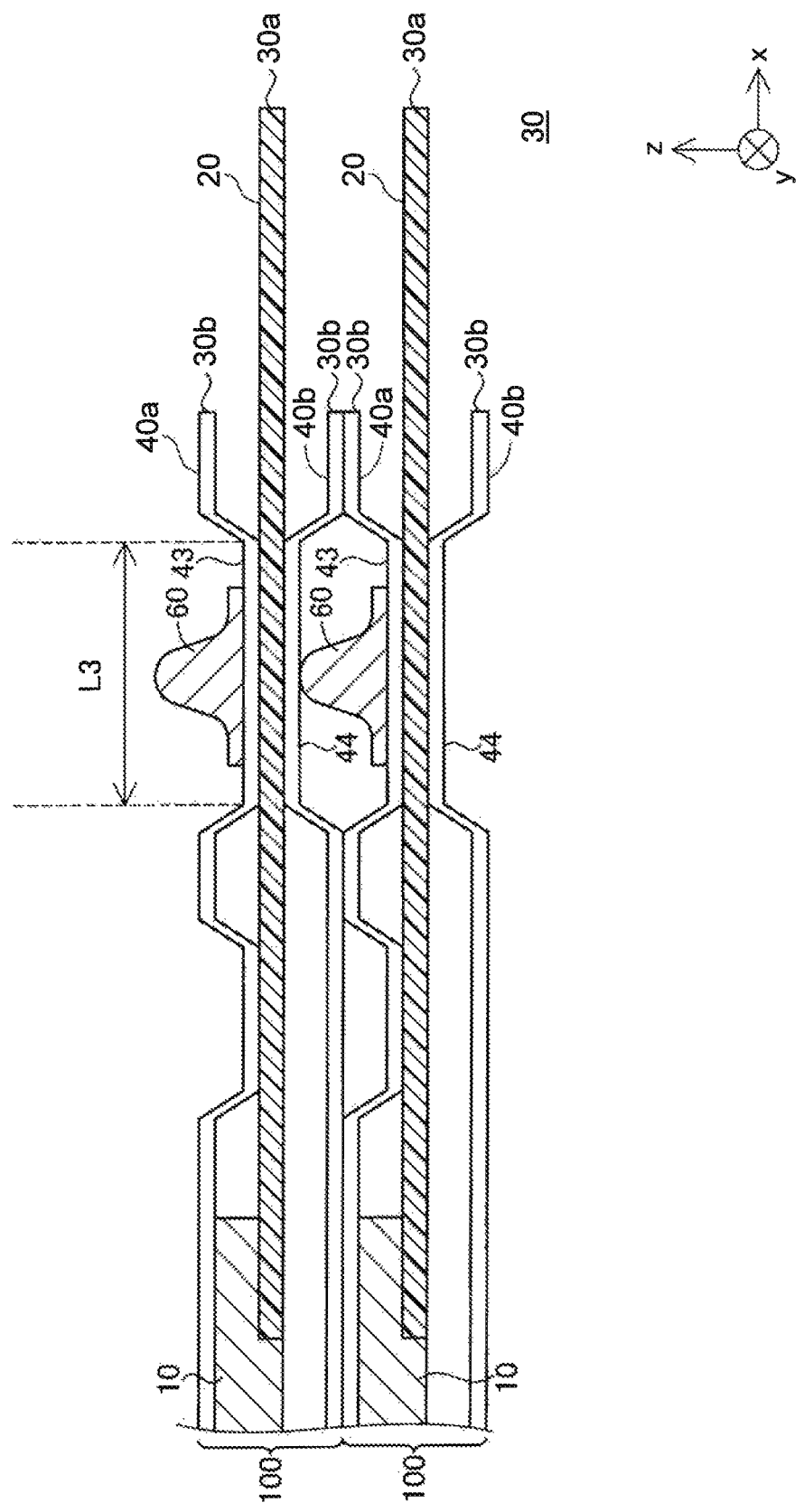
FIG. 3 is a cross-sectional view taken along line III-III in FIG. 2.

FIG. 3 is a cross-sectional view taken along line III-III in FIG. 2, and illustrates the case where two or more fuel cells 100 are stacked together. Between adjacent ones of the fuel cells 100, a gasket 60 is provided between the separator 40a of one of the fuel cells 100 and the separator 40b of the other fuel cell 100. In this embodiment, the gasket 60 is bonded to a recessed portion 43 of the separator 40a provided around the separator-side manifold 30b, more specifically, the recessed portion 43 provided at a position of the separator 40a which faces the gas introduction channels 50. A surface of the recessed portion 43 opposite to the gasket 60 is bonded to the resin frame 20. A recessed portion 44 is also formed in the separator 40b, and its bottom is bonded to the resin frame 20. End portions of the separators 40a, 40b are respectively spaced apart from the resin frame 20 in the lamination direction (z-axis direction), and protrude toward the insides of the manifolds 30.

The gasket 60 is formed of silicone rubber, for example. Coolant channels through which the coolant from the coolant manifolds 31 flows are formed between adjacent ones of the fuel cells 100, and the coolant channels are sealed by the gasket 60.

Figure 4:
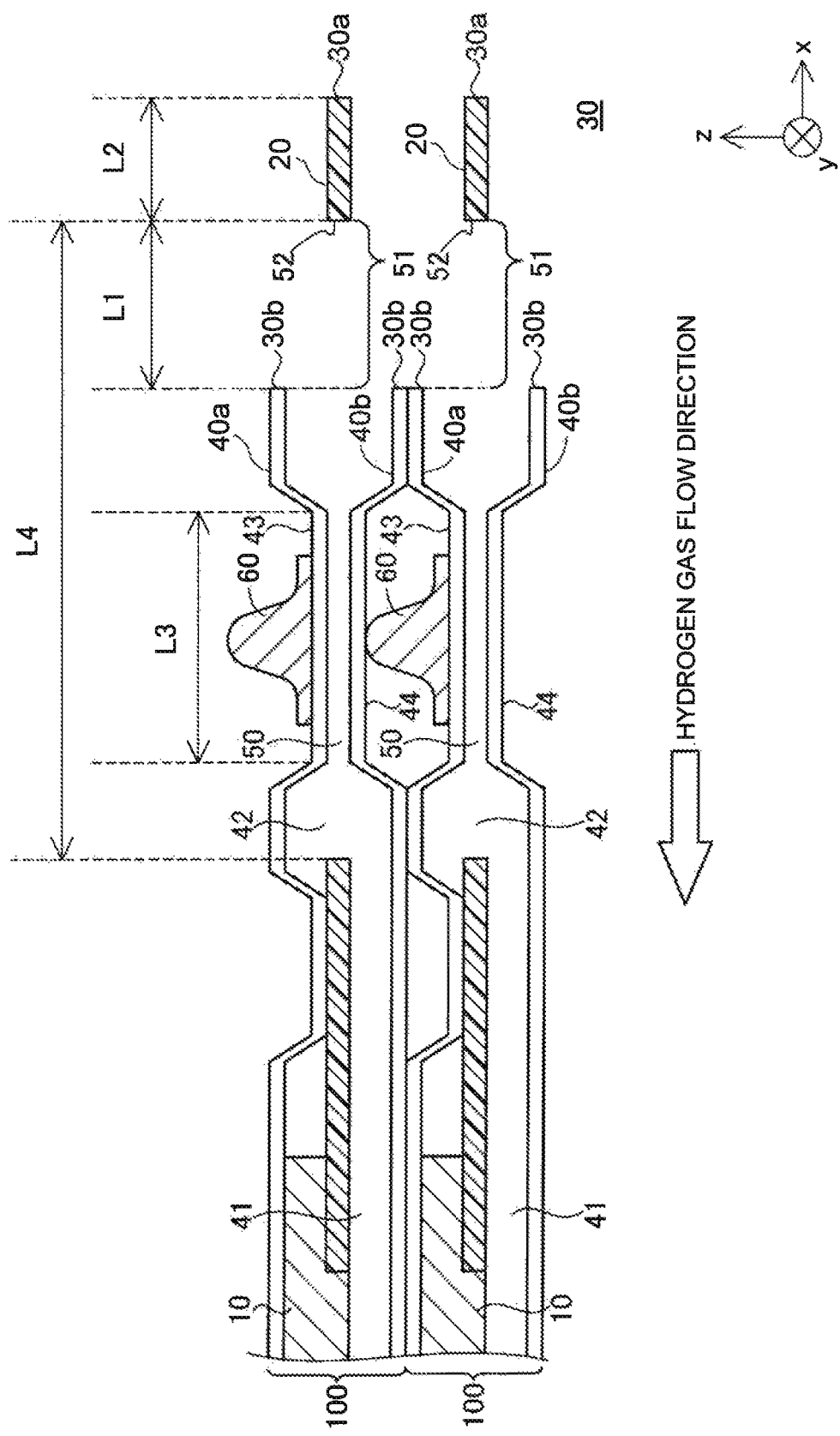
FIG. 4 is a cross-sectional view taken along line IV-IV in FIG. 2.

FIG. 4 is a cross-sectional view taken along line IV-IV in FIG. 2, and illustrates the case where two or more fuel cells 100 are stacked together. More specifically, the cross-sectional view of FIG. 4 is obtained by cutting the fuel cells 100 along one of the gas introduction channels 50. The length L3 (width) of the recessed portions 43, 44 as measured along the direction of flow of gas in the gas introduction channels 50 is shorter than the length L4 of the gas introduction channels 50. Also, each of the gas introduction channels 50 is provided at a position opposed to the lower surface of the corresponding recessed portion 43.

As indicated by an arrow in FIG. 4, the gas introduction channel 50 permits hydrogen gas to flow from the manifolds 30 into the power generating body 10. More specifically, hydrogen gas flows from the manifolds 30 into the gas introduction channels 50 via the gas introduction parts 51. Then, the hydrogen gas is distributed to the respective flow channels 41 via the distribution flow channels 42, and supplied to the anode side of the power generating body 10.

Figure 5:
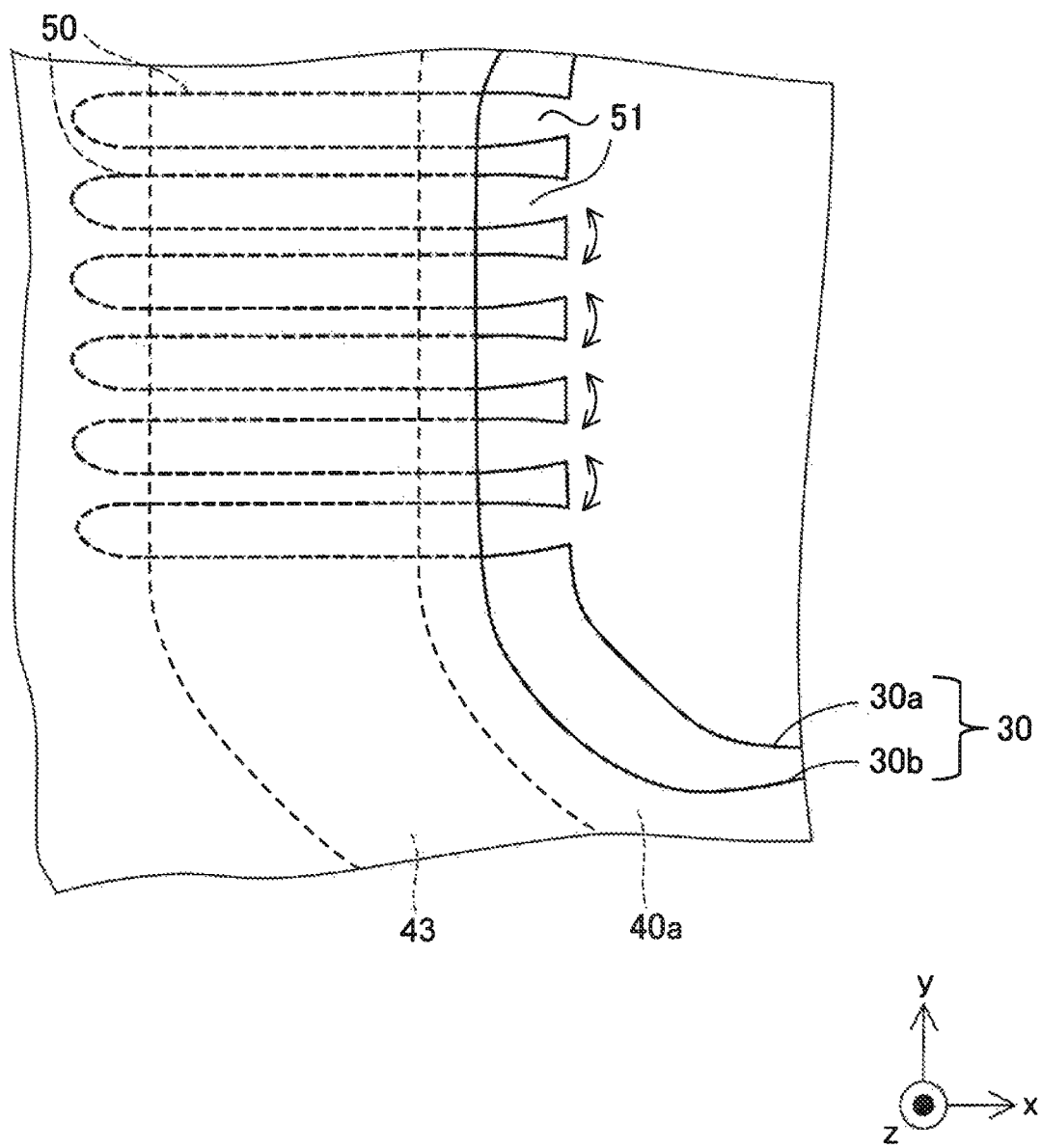
FIG. 5 is a reference view of the "A" portion of FIG. 2.

FIG. 5 is a reference view showing the structure of the "A" portion of FIG. 1 when the end portions 52 of the gas introduction parts 51 closer to the manifolds 30 in FIG. 2 are cut off. In other words, the structure in the case where the length L2 is zero is illustrated. In this structure, when reaction gas is introduced, the gas introduction parts 51 may bend or flop in the y-axis direction, for example, and the gas introduction channels 50 may be partially closed.

Figure 6:
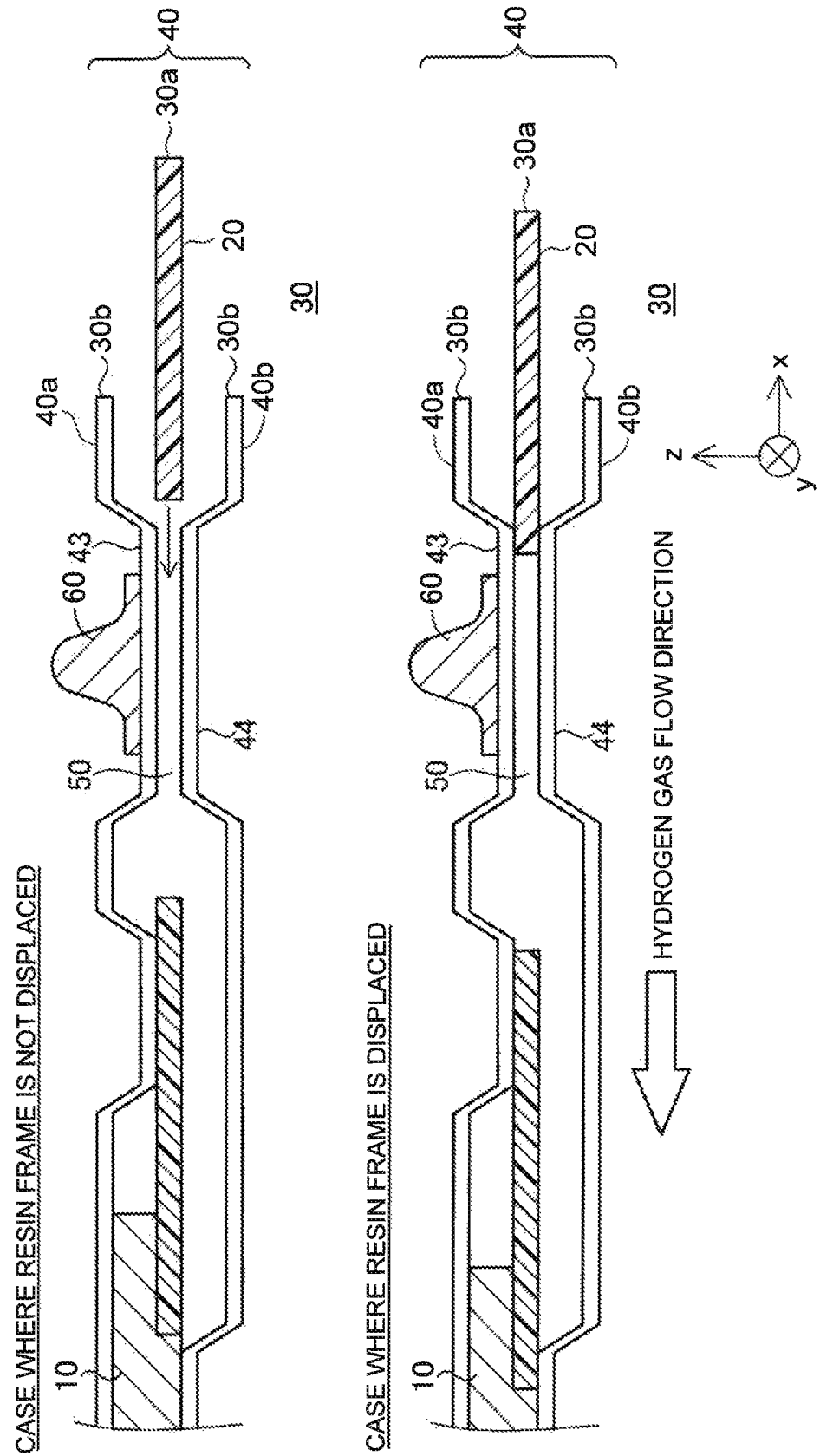
FIG. 6 is a reference view of a cross-section taken along line IV-IV in FIG. 2.

FIG. 6 is a reference view showing the structure of a portion corresponding to the cross-section (FIG. 4) taken along line IV-IV in FIG. 2, in the case where the gas introduction channels 50 do not extend into the separator-side manifold 30b. With this structure, when the position of the resin frame 20 relative to the separators 40 is shifted in a direction of an arrow (−x-axis direction) in FIG. 6 due to a manufacturing error, for example, an inlet through which the reaction gas is introduced may be closed or blocked, as indicated in the lower section of FIG. 6. Therefore, variation in the pressure loss is increased, and the voltage may become unstable.

As compared with the structures shown in FIG. 5 and FIG. 6, in the fuel cell 100 of this embodiment, the gas introduction channels 50 formed in the resin frame 20 extend into the separator-side manifolds 30b; therefore, even when the position of the resin frame 20 relative to the separators 40 is shifted due to a manufacturing error, for example, the inlet is less likely or unlikely to be closed or blocked. Accordingly, variation in the pressure loss at the time of introduction of reaction gas into the fuel cell 100 can be reduced or eliminated. Also, the gas introduction channels 50 are formed between the resin-frame-side manifold 30a and the opening 21, and the end portions 52 of the gas introduction parts 51 are connected; therefore, the gas introduction parts 51 are prevented from being partially closed due to bending (flopping) of the gas introduction parts 51 in the y-axis direction.

Also, in this embodiment, since the length L1 of the gas introduction parts 51 is the same length, variation in the pressure loss among the gas introduction channels 50 can be reduced or eliminated. Further, since the distribution flow channels 42 are provided between the resin frame 20 and the separators 40, the reaction gas introduced from the gas introduction channels 50 can be distributed to a larger number of flow channels 41, and the power generation efficiency can be improved. With the distribution flow channels 42 thus provided, even when the position of the resin frame 20 relative to the separators 40 is shifted, the end portions of the gas introduction channels 50 closer to the separators 40 are less likely or unlikely to be closed.

Also, in this embodiment, the separators 40a, 40b have respective recessed portions 43, 44; therefore, the total thickness of the two or more fuel cells 100 stacked together can be reduced by an amount corresponding to the thickness of the recessed portions. Therefore, the thickness of the fuel cells 100 stacked together can be prevented from being excessively increased. While the separators 40a, 40b have respective recessed portions 43, 44 in this embodiment, either one of the separator 40a and the separator 40b may have a recessed portion. Also, the recessed portions 43, 44 may be omitted.

In the illustrated embodiment, the structure of the gas introduction channels 50 on the side where hydrogen gas flows into the power generating body 10 has been described above. However, the structure of the gas introduction channels 50 on the side where oxygen gas flows into the power generating body 10 may be similar to the structure of the gas introduction channels 50 as described above. Also, the structure of gas discharge channels on the side where reaction gas is discharged from the power generating body 10 may be similar to the structure of the gas introduction channels 50 as described above.

B. Modified Examples

First Modified Example

Figure 7:
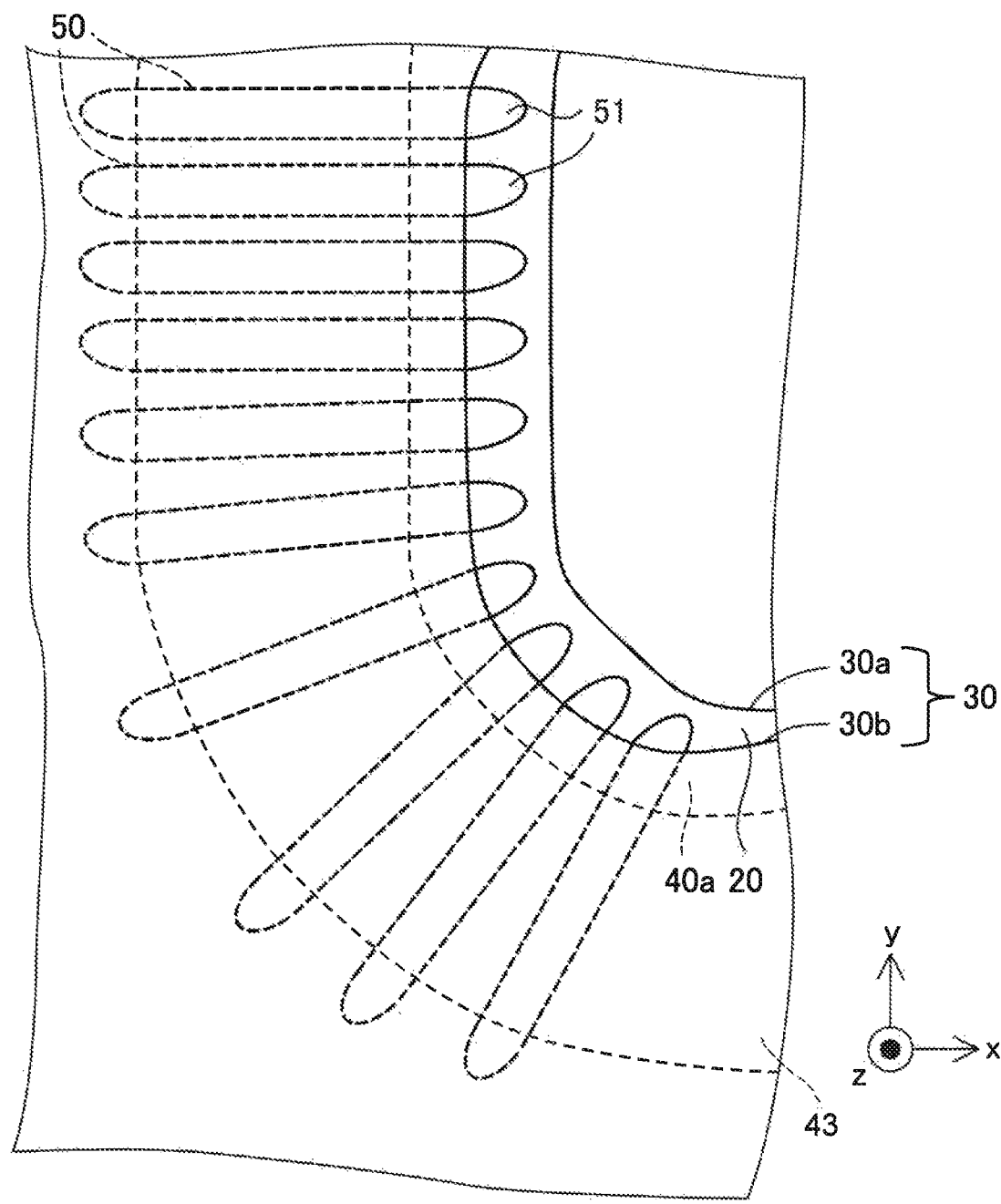
FIG. 7 is an enlarged view of the "A" portion of FIG. 1, showing a first modified example.

FIG. 7 is an enlarged view of a first modified example corresponding to the enlarged view (FIG. 2) of the "A" portion, which illustrates the case where the resin frame 20 and the pair of separators 40 of FIG. 1 are joined together. In the illustrated embodiment, the gas introduction channels 50 are formed in parallel with each other, when viewed in the direction (z-axis direction) of lamination of the separators 40 on the resin frame 20. On the other hand, as shown in FIG. 7, the gas introduction channels 50 may be formed such that some of the channels 50 are arranged in a fan-like form against the manifolds 30.

Second Modified Example

In the illustrated embodiment, the resin frame 20 has a plurality of gas introduction channels 50, and the length L1 of all of the gas introduction parts 51 is the same length. On the other hand, the gas introduction parts 51 of some of the gas introduction channels 50 may have a different length or lengths.

Third Modified Example

In the illustrated embodiment, the fuel cell 100 has the distribution flow channels 42 that distribute reaction gas supplied from the gas introduction channels 50 to the flow channels 41. On the other hand, the fuel cell 100 may not have the distribution flow channels 42, and each of the gas introduction channels 50 may be directly connected to a corresponding one of the flow channels 41.

Fourth Modified Example

Figure 8:
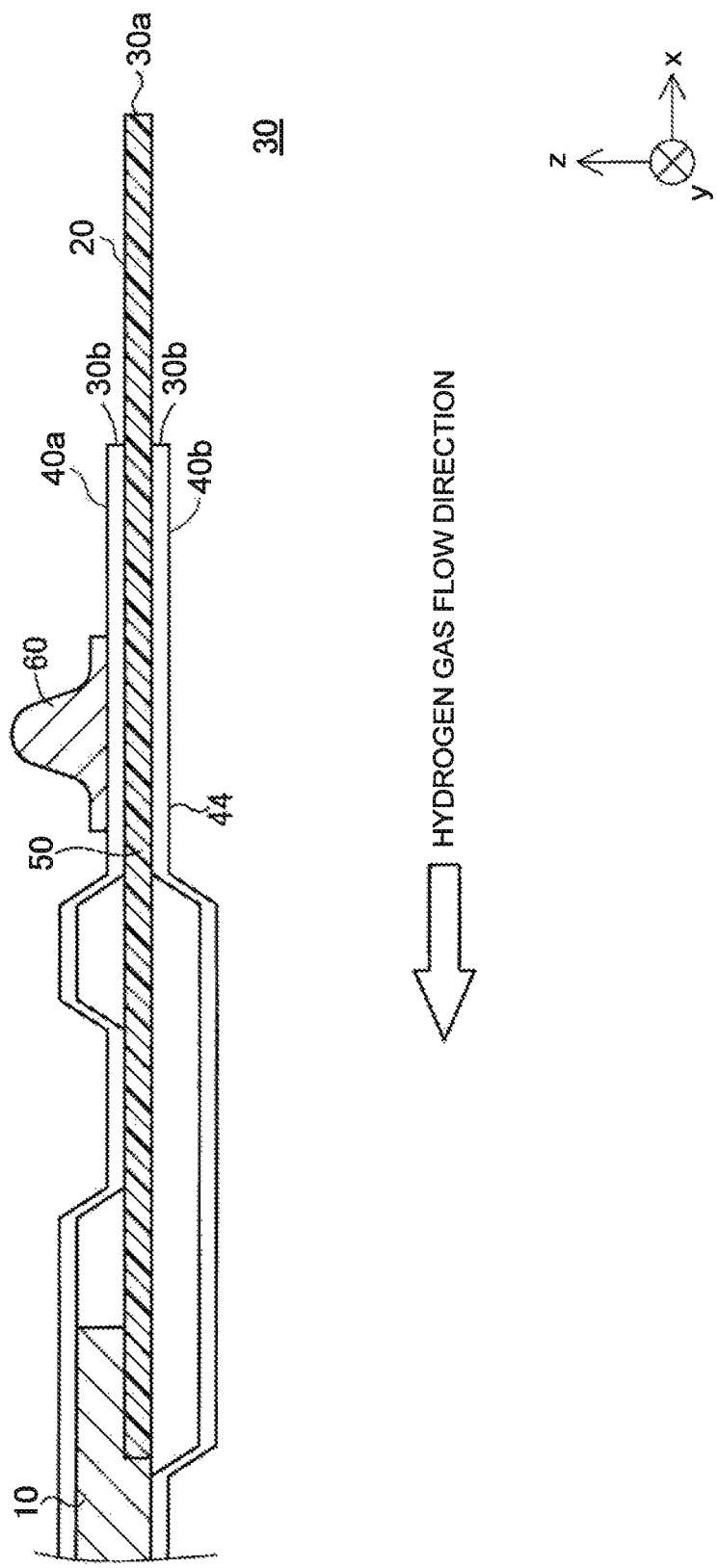
FIG. 8 is a cross-sectional view taken along line IV-IV in FIG. 2, showing a fourth modified example.
Figure 9:
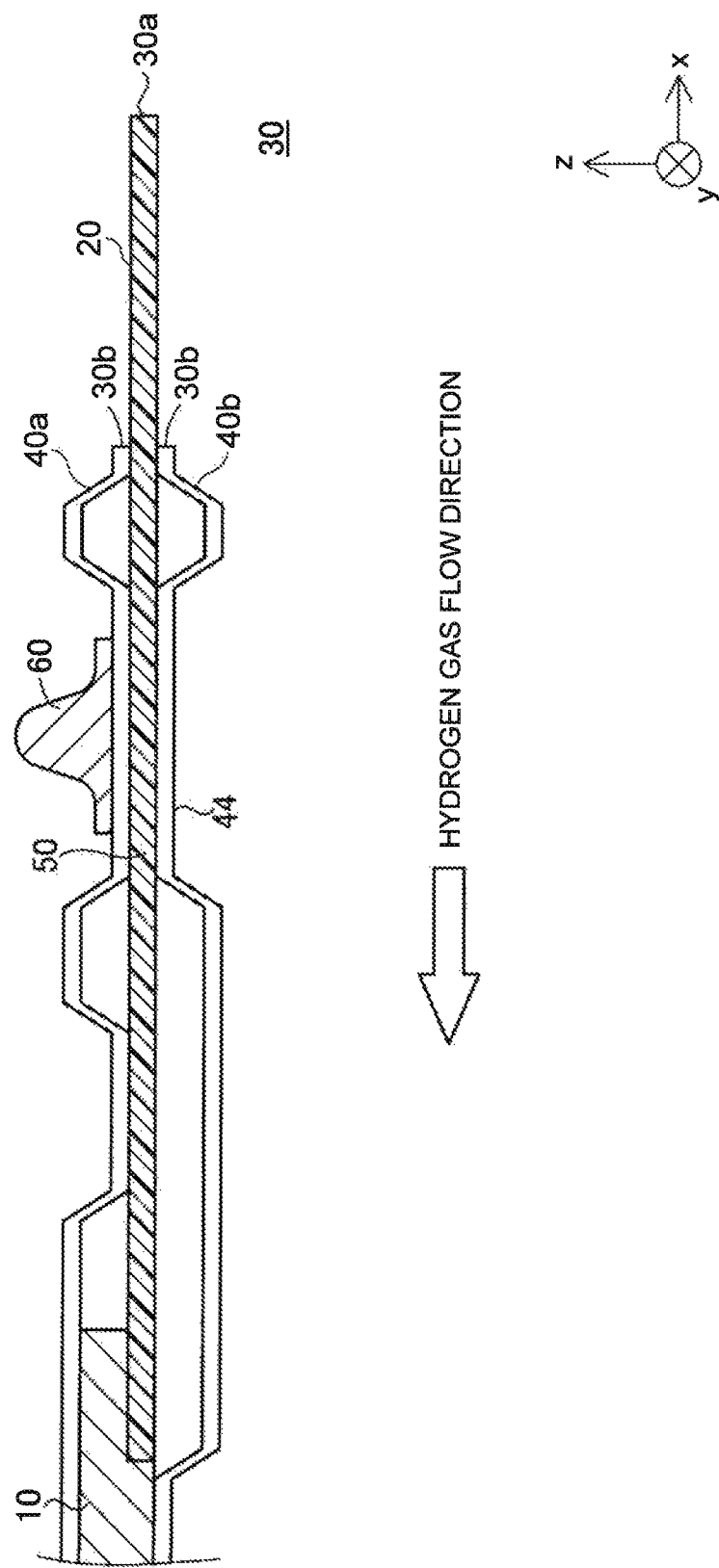
FIG. 9 is a cross-sectional view taken along line IV-IV in FIG. 2, showing the fourth modified example.

FIG. 8 and FIG. 9 are cross-sectional views of a fourth modified example, which correspond to the cross-sectional view (FIG. 3) taken along line III-III in FIG. 2. In the illustrated embodiment, the end portions of the separators 40 at the peripheral edges of the manifolds 30 are respectively spaced apart from the resin frame 20 in the lamination direction (z-axis direction), and protrude toward the interiors of the gas introduction channels 50. On the other hand, as shown in FIG. 8, the end portions of the separators 40 at the peripheral edges of the manifolds 30 may not be spaced apart from the resin frame 20. Also, as shown in FIG. 9, the end portions of the separators 40 at the peripheral edges of the manifolds 30 may be spaced apart from the resin frame 20 in the lamination direction, and then contact with the resin frame 20 again, as they proceed toward the manifolds 30.

The present disclosure is not limited to the above embodiment and modified examples, but may be realized with various arrangements, without departing from its principle. For example, the technical features in the embodiment and modified examples, which correspond to the technical features described in the "SUMMARY" above, may be replaced or combined as appropriate, so as to solve the problem as described above, or achieve a part or all of the above-described effects. Also, the technical features may be deleted as appropriate, if they are not described as being essential to the disclosure in this specification.

What is claimed is:

1. A fuel cell comprising:
a power generating body including a membrane electrode assembly;
a resin frame placed around the power generating body; and
a pair of separators laminated on the resin frame so as to sandwich the power generating body and the resin frame, wherein
the resin frame has a resin-frame-side manifold in which reaction gas flows in a direction passing through the resin frame, an opening that holds the power generating body, and a gas introduction channel formed through the resin frame between the resin-frame-side manifold and the opening,
the pair of separators has a separator-side manifold through which the reaction gas flows, the separator-side manifold being provided at a position corresponding to the resin-frame-side manifold as viewed in a lamination direction,
an opening area of the resin-frame-side manifold is smaller than an opening area of the separator-side manifold,
the gas introduction channel has a gas introduction part that extends into the separator-side manifold, when viewed in the lamination direction, and
a portion of the gas introduction part overlaps the separator-side manifold, when viewed in the lamination direction.

2. The fuel cell according to claim 1, wherein:
at least one of the pair of separators has a recessed portion at a position facing the gas introduction channel; and
a length of the recessed portion along a direction of gas flow in the gas introduction channel is shorter than a length of the gas introduction channel.

3. The fuel cell according to claim 1, wherein:
the resin frame has a plurality of gas introduction channels between the resin-frame-side manifold and the opening, each of the plurality of gas introduction channels being the gas introduction channel of the resin frame; and
the gas introduction parts of at least a part of the plurality of gas introduction channels have substantially the same length.

4. The fuel cell according to claim 1, wherein:
a plurality of flow channels that permit the reaction gas to flow into the power generating body are connected with the gas introduction channel, between the pair of separators and the resin frame; and
the pair of separators has a distribution flow channel that distributes the reaction gas supplied from the gas introduction channel to the flow channels.

* * * * *